(12) United States Patent
Jensen et al.

(10) Patent No.: US 8,531,191 B2
(45) Date of Patent: Sep. 10, 2013

(54) SENSOR ASSEMBLY AND METHODS OF MEASURING A PROXIMITY OF A MACHINE COMPONENT TO A SENSOR

(75) Inventors: Raymond Jensen, Gardnerville, NV (US); Dwayne Folden, Reno, NV (US); Philip Hanifan, Emigrant, MT (US)

(73) Assignee: General Electric Company, Schenectady, NY (US)

( * ) Notice: Subject to any disclaimer, the term of this patent is extended or adjusted under 35 U.S.C. 154(b) by 350 days.

(21) Appl. No.: 12/951,438

(22) Filed: Nov. 22, 2010

(65) Prior Publication Data

US 2012/0126830 A1 May 24, 2012

(51) Int. Cl.
*G01R 27/04* (2006.01)
(52) U.S. Cl.
USPC .......................................... 324/635
(58) Field of Classification Search
USPC ......... 324/762.01–762.1, 635, 750.01–750.3; 257/48
See application file for complete search history.

(56) References Cited

U.S. PATENT DOCUMENTS

| | | | |
|---|---|---|---|
| 4,045,727 A | 8/1977 | Yu et al. | |
| 4,313,118 A | 1/1982 | Calvin | |
| 4,346,383 A | 8/1982 | Woolcock et al. | |
| 4,384,819 A | 5/1983 | Baker | |
| 4,652,864 A | 3/1987 | Calvin | |
| 4,845,422 A | 7/1989 | Damon | |
| 4,862,061 A | 8/1989 | Damon | |
| 5,097,227 A | 3/1992 | Yuan et al. | |
| 5,227,667 A | 7/1993 | Takinami et al. | |
| 5,334,969 A | 8/1994 | Abe et al. | |
| 5,459,397 A | 10/1995 | Spillman, Jr. | |
| 5,459,405 A | 10/1995 | Wolff et al. | |
| 5,506,515 A | 4/1996 | Godshalk et al. | |
| 5,600,253 A | 2/1997 | Cohen et al. | |
| 5,670,886 A | 9/1997 | Wolff et al. | |
| 5,801,530 A | 9/1998 | Crosby et al. | |
| 5,818,242 A | 10/1998 | Grzybowski et al. | |
| 5,854,994 A | 12/1998 | Canada et al. | |
| 5,963,034 A | 10/1999 | Mahapatra et al. | |
| 5,992,237 A | 11/1999 | McCarty et al. | |
| 6,043,774 A | 3/2000 | Singh et al. | |
| 6,118,287 A | 9/2000 | Boll et al. | |

(Continued)

FOREIGN PATENT DOCUMENTS

WO 2008019862 A2 2/2008

OTHER PUBLICATIONS

Search Report and Written Opinion from corresponding EP Application No. 11189437.4-2213 dated Feb. 15, 2012.

(Continued)

*Primary Examiner* — Tung X Nguyen
(74) *Attorney, Agent, or Firm* — Global Patent Operation; Mark A. Conklin

(57) ABSTRACT

A microwave sensor assembly includes a signal generator for generating at least one microwave signal and an emitter coupled to the signal generator. The emitter is configured to generate an electromagnetic field from the at least one microwave signal, wherein the emitter is detuned when an object is positioned within the electromagnetic field such that a loading signal is generated. The microwave sensor assembly also includes a detector coupled to the emitter and to the signal generator. The detector is configured to calculate at least one of an amplitude, a phase, and a power of the loading signal at a primary frequency of the loading signal for use in measuring a proximity of an object to the emitter.

17 Claims, 3 Drawing Sheets

(56) References Cited

U.S. PATENT DOCUMENTS

| | | |
|---|---|---|
| 6,227,703 B1 | 5/2001 | DiMatteo et al. |
| 6,261,247 B1 | 7/2001 | Ishikawa et al. |
| 6,320,550 B1 | 11/2001 | Van Voorhies |
| 6,407,562 B1 | 6/2002 | Whiteman |
| 6,437,751 B1 | 8/2002 | Craven et al. |
| 6,445,995 B1 | 9/2002 | Mollmann |
| 6,462,561 B1 | 10/2002 | Bigelow et al. |
| 6,620,057 B1 | 9/2003 | Pirritano et al. |
| 6,750,621 B2 | 6/2004 | Gandrud |
| 6,778,132 B2 | 8/2004 | Palata |
| 6,864,796 B2 | 3/2005 | Lehrman et al. |
| 6,878,147 B2 | 4/2005 | Prakash et al. |
| 6,984,994 B2 | 1/2006 | Gregg |
| 7,073,384 B1 | 7/2006 | Donskoy et al. |
| 7,079,029 B2 | 7/2006 | Tsuji |
| 7,079,030 B2 | 7/2006 | Tsuji |
| 7,119,737 B2 | 10/2006 | Tsuji |
| 7,159,774 B2 | 1/2007 | Woodard et al. |
| 7,173,435 B1 * | 2/2007 | Fay et al. ............. 324/636 |
| 7,176,829 B2 | 2/2007 | Tsuji |
| 7,206,719 B2 | 4/2007 | Lindsay et al. |
| 7,215,111 B2 | 5/2007 | Kaneyasu et al. |
| 7,215,252 B2 | 5/2007 | Schenck |
| 7,216,054 B1 * | 5/2007 | Pchelnikov et al. ........ 702/150 |
| 7,250,920 B1 | 7/2007 | Steinbrecher |
| 7,256,376 B2 | 8/2007 | Tsuji |
| 7,274,189 B2 | 9/2007 | Chen et al. |
| 7,318,824 B2 | 1/2008 | Prakash et al. |
| 7,423,934 B1 | 9/2008 | Uzes |
| 7,455,495 B2 | 11/2008 | Leogrande et al. |
| 7,483,800 B2 | 1/2009 | Geisheimer et al. |
| 7,492,165 B2 | 2/2009 | Maier et al. |
| 7,527,623 B2 | 5/2009 | Prakash et al. |
| 7,532,151 B2 | 5/2009 | Touge et al. |
| 7,541,995 B1 | 6/2009 | Murphy, Jr. |
| 7,554,324 B2 | 6/2009 | Gualtieri |
| 7,604,413 B2 | 10/2009 | Koike et al. |
| 2008/0303513 A1 | 12/2008 | Turner |
| 2009/0085582 A1 | 4/2009 | Sinha |
| 2009/0102451 A1 | 4/2009 | Kwark |
| 2009/0243915 A1 | 10/2009 | Nishizato et al. |
| 2010/0125269 A1 | 5/2010 | Emmons et al. |
| 2010/0211334 A1 | 8/2010 | Sheikman et al. |
| 2010/0223983 A1 | 9/2010 | Trummer |

OTHER PUBLICATIONS

Woods, G. S. et al., "A High Accuracy Microwave Ranging System for Industrial Applications", IEEE Transactions on Instrumentation and Measurement, vol. 42, No. 4, pp. 812-816, Aug. 1, 1993.

* cited by examiner

SENSOR ASSEMBLY AND METHODS OF MEASURING A PROXIMITY OF A MACHINE COMPONENT TO A SENSOR

BACKGROUND OF THE INVENTION

The present application relates generally to power systems and, more particularly, to a sensor assembly and methods of measuring the proximity of a machine component relative to a sensor.

Known machines may exhibit vibrations and/or other abnormal behavior during operation. One or more sensors may be used to measure and/or monitor such behavior and to determine, for example, an amount of vibration exhibited in a machine drive shaft, a rotational speed of the machine drive shaft, and/or any other suitable operational characteristic of an operating machine or motor. Often, the sensors are coupled to a machine monitoring system that includes a plurality of monitors. The monitoring system receives signals representative of measurements from one or more sensors, performs at least one processing step on the signals, and then transmits the modified signals to a diagnostic platform that displays the measurements to a user.

At least some known sensors use one or more power detection devices to detect and/or to determine an amount of power contained within signals received from an antenna when monitoring an object. However, known antennas may receive frequencies from signal sources other than the monitored object. The power detection device may be unable to distinguish a frequency associated with the monitored object from frequencies received from other sources. As such, known power detection devices may undesirably determine an amount of power contained within the plurality of frequencies, rather than only determining an amount of power contained solely within the frequency or frequencies associated with the monitored object. As such, a proximity measurement based on the inaccurate power measurement may also be inaccurate.

BRIEF DESCRIPTION OF THE INVENTION

In one embodiment, a microwave sensor assembly is provided that includes a signal generator for generating at least one microwave signal and an emitter coupled to the signal generator. The emitter is configured to generate an electromagnetic field from the at least one microwave signal, wherein the emitter is detuned when an object is positioned within the electromagnetic field such that a loading signal is generated. The microwave sensor assembly also includes a detector coupled to the emitter and to the signal generator. The detector is configured to calculate at least one of an amplitude, a phase, and a power of the loading signal at a primary frequency of the loading signal for use in measuring a proximity of an object to the emitter.

In another embodiment, a power system is provided that includes a machine including at least one component and a microwave sensor assembly positioned proximate to the at least one component. The microwave sensor assembly includes a signal generator for generating at least one microwave signal and an emitter coupled to the signal generator. The emitter is configured to generate an electromagnetic field from the at least one microwave signal, wherein the emitter is detuned when an object is positioned within the electromagnetic field such that a loading signal is generated. The microwave sensor assembly also includes a detector coupled to the emitter and to the signal generator. The detector is configured to calculate at least one of an amplitude, a phase, and a power of the loading signal at a primary frequency of the loading signal for use in measuring a proximity of the at least one component to the emitter.

In yet another embodiment, a method for measuring a proximity of a machine component is provided that includes transmitting at least one microwave signal to an emitter and generating an electromagnetic field from the at least one microwave signal. A loading signal representative of a disruption of the electromagnetic field is generated. At least one of an amplitude, a phase, and a power of the loading signal at a primary frequency of the loading signal is calculated. A proximity of the machine component to the emitter is calculated based on at least one of the calculated amplitude, phase, and power of the loading signal.

DETAILED DESCRIPTION OF THE INVENTION

Figure 1:
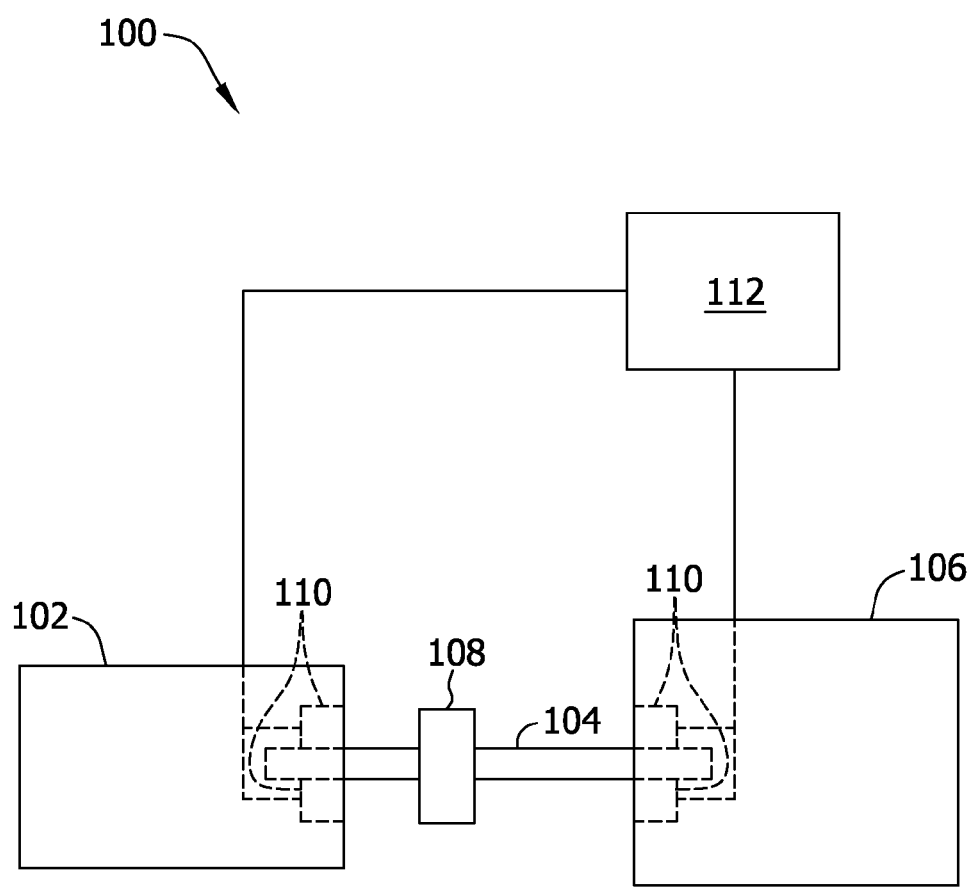
FIG. 1 is a block diagram of an exemplary power system.

FIG. 1 shows an exemplary power system 100 that includes a machine 102. In the exemplary embodiment, machine 102 may be, but is not limited to only being, a wind turbine, a hydroelectric turbine, a gas turbine, or a compressor. Alternatively, machine 102 may be any other machine used in a power system. In the exemplary embodiment, machine 102 rotates a drive shaft 104 that is coupled to a load 106, such as a generator.

In the exemplary embodiment, drive shaft 104 is at least partially supported by one or more bearings (not shown) housed within machine 102 and/or within load 106. Alternatively or additionally, the bearings may be housed within a separate support structure 108, such as a gearbox, or within any other structure or component that enables power system 100 to function as described herein.

In the exemplary embodiment, power system 100 includes at least one sensor assembly 110 that measures and/or monitors at least one operating condition of machine 102, of drive shaft 104, of load 106, and/or of any other component of power system 100 that enables system 100 to function as described herein. More specifically, in the exemplary embodiment, sensor assembly 110 is a proximity sensor assembly 110 that is positioned in close proximity to drive shaft 104 for measuring and/or monitoring a distance (not shown in FIG. 1) defined between drive shaft 104 and sensor assembly 110. Moreover, in the exemplary embodiment, sensor assembly 110 uses microwave signals to measure a proximity of a component of power system 100 with respect to sensor assembly 110. As used herein, the term "microwave" refers to a signal or a component that receives and/or transmits signals having one or more frequencies between about 300 megahertz (MHz) and about 300 gigahertz (GHz). Alternatively, sensor assembly 110 may measure and/or monitor any other component of power system 100, and/or may be any other sensor or transducer assembly that enables power system 100 to function as described herein. In the exemplary embodiment, each sensor assembly 110 is positioned in any location within power system 100. Moreover, in the exemplary embodiment, at least one sensor assembly 110 is coupled to a diagnostic system 112 for use in processing and/or analyzing one or more signals generated by sensor assemblies 110.

During operation, in the exemplary embodiment, the operation of machine 102 may cause one or more components of power system 100, such as drive shaft 104, to change position with respect to at least one sensor assembly 110. For example, vibrations may be induced to the components and/or the components may expand or contract as the operating temperature within power system 100 changes. In the exemplary embodiment, sensor assemblies 110 measure and/or monitor the proximity and/or the position of the components relative to each sensor assembly 110 and transmit a signal representative of the measured proximity and/or position of the components (hereinafter referred to as a "proximity measurement signal") to diagnostic system 112 for processing and/or analysis.

Figure 2:
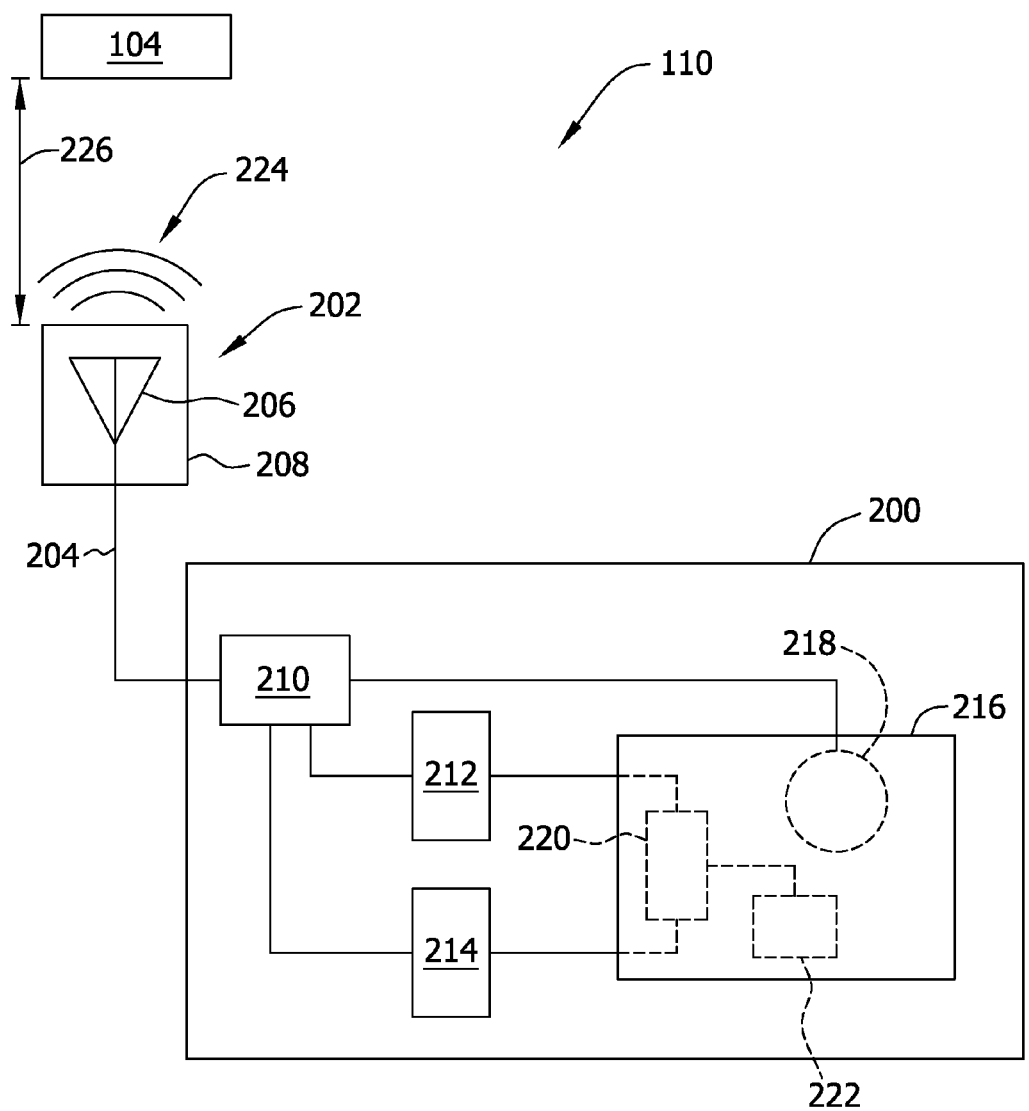
FIG. 2 is a block diagram of an exemplary sensor assembly that may be used with the power system shown in FIG. 1.

FIG. 2 is a schematic diagram of an exemplary sensor assembly 110 that may be used with power system 100 (shown in FIG. 1). In the exemplary embodiment, sensor assembly 110 includes a signal processing device 200 and a probe 202 that is coupled to signal processing device 200 via a data conduit 204. Moreover, in the exemplary embodiment, probe 202 includes an emitter 206 that is coupled to and/or positioned within a probe housing 208. More specifically, in the exemplary embodiment, probe 202 is a microwave probe 202 that includes a microwave emitter 206. As such, in the exemplary embodiment, emitter 206 has at least one resonant frequency that is within a microwave frequency range.

In the exemplary embodiment, signal processing device 200 includes a directional coupling device 210 that is coupled to a transmission signal detector 212, to a reception signal detector 214, and to a signal conditioning device 216. Moreover, in the exemplary embodiment, signal conditioning device 216 includes a signal generator 218, a subtractor 220, and a linearizer 222. Emitter 206 emits an electromagnetic field 224 when a microwave signal is transmitted through emitter 206.

During operation, in the exemplary embodiment, signal generator 218 generates at least one electrical signal having a microwave frequency (hereinafter referred to as a "microwave signal") that is equal or approximately equal to the resonant frequency of emitter 206. Signal generator 218 transmits the microwave signal to directional coupling device 210. Directional coupling device 210 transmits the microwave signal to transmission signal detector 212 and to emitter 206. As the microwave signal is transmitted through emitter 206, electromagnetic field 224 is emitted from emitter 206 and out of probe housing 208. If an object, such as a drive shaft 104 or another component of machine 102 (shown in FIG. 1) and/or of power system 100 enters and/or changes a relative position within electromagnetic field 224, an electromagnetic coupling may occur between the object and field 224. More specifically, because of the presence of the object within electromagnetic field 224 and/or because of such object movement, electromagnetic field 224 may be disrupted, for example, because of an induction and/or capacitive effect induced within the object that may cause at least a portion of electromagnetic field 224 to be inductively and/or capacitively coupled to the object as an electrical current and/or charge. In such an instance, emitter 206 is detuned (i.e., a resonant frequency of emitter 206 is reduced and/or changed) and a loading is induced to emitter 206. The loading induced to emitter 206 causes a reflection of the microwave signal (hereinafter referred to as a "detuned loading signal") to be transmitted through data conduit 204 to directional coupling device 210. In the exemplary embodiment, the detuned loading signal has a lower power amplitude and/or a different phase than the power amplitude and/or the phase of the microwave signal. Moreover, in the exemplary embodiment, the power amplitude of the detuned loading signal is dependent upon the proximity of the object to emitter 206. Directional coupling device 210 transmits the detuned loading signal to reception signal detector 214.

In the exemplary embodiment, reception signal detector 214 determines an amount of power based on and/or contained within the detuned loading signal and transmits a signal representative of the detuned loading signal power to signal conditioning device 216. Moreover, transmission signal detector 212 determines an amount of power based on and/or contained within the microwave signal and transmits a signal representative of the microwave signal power to signal conditioning device 216. In the exemplary embodiment, subtractor 220 receives the microwave signal power and the detuned loading signal power, and calculates a difference between the microwave signal power and the detuned loading signal power. Subtractor 220 transmits a signal representative of the calculated difference (hereinafter referred to as a "power difference signal") to linearizer 222. In the exemplary embodiment, an amplitude of the power difference signal is proportional, such as inversely or exponentially proportional, to a distance 226 defined between the object, such as drive shaft 104, within electromagnetic field 224 and probe 202 and/or emitter 206 (i.e., distance 226 is known as the object proximity). Depending on the characteristics of emitter 206, such as, for example, the geometry of emitter 206, the amplitude of the power difference signal may at least partially exhibit a non-linear relationship with respect to the object proximity.

In the exemplary embodiment, linearizer 222 transforms the power difference signal into a voltage output signal (i.e., the "proximity measurement signal") that exhibits a substantially linear relationship between the object proximity and the amplitude of the proximity measurement signal. Moreover, in the exemplary embodiment, linearizer 222 transmits the proximity measurement signal to diagnostic system 112 (shown in FIG. 1) with a scale factor that is suitable for processing and/or analysis within diagnostic system 112. In the exemplary embodiment, the proximity measurement signal has a scale factor of volts per millimeter. Alternatively, the proximity measurement signal may have any other scale factor that enables diagnostic system 112 and/or power system 100 to function as described herein.

Figure 3:
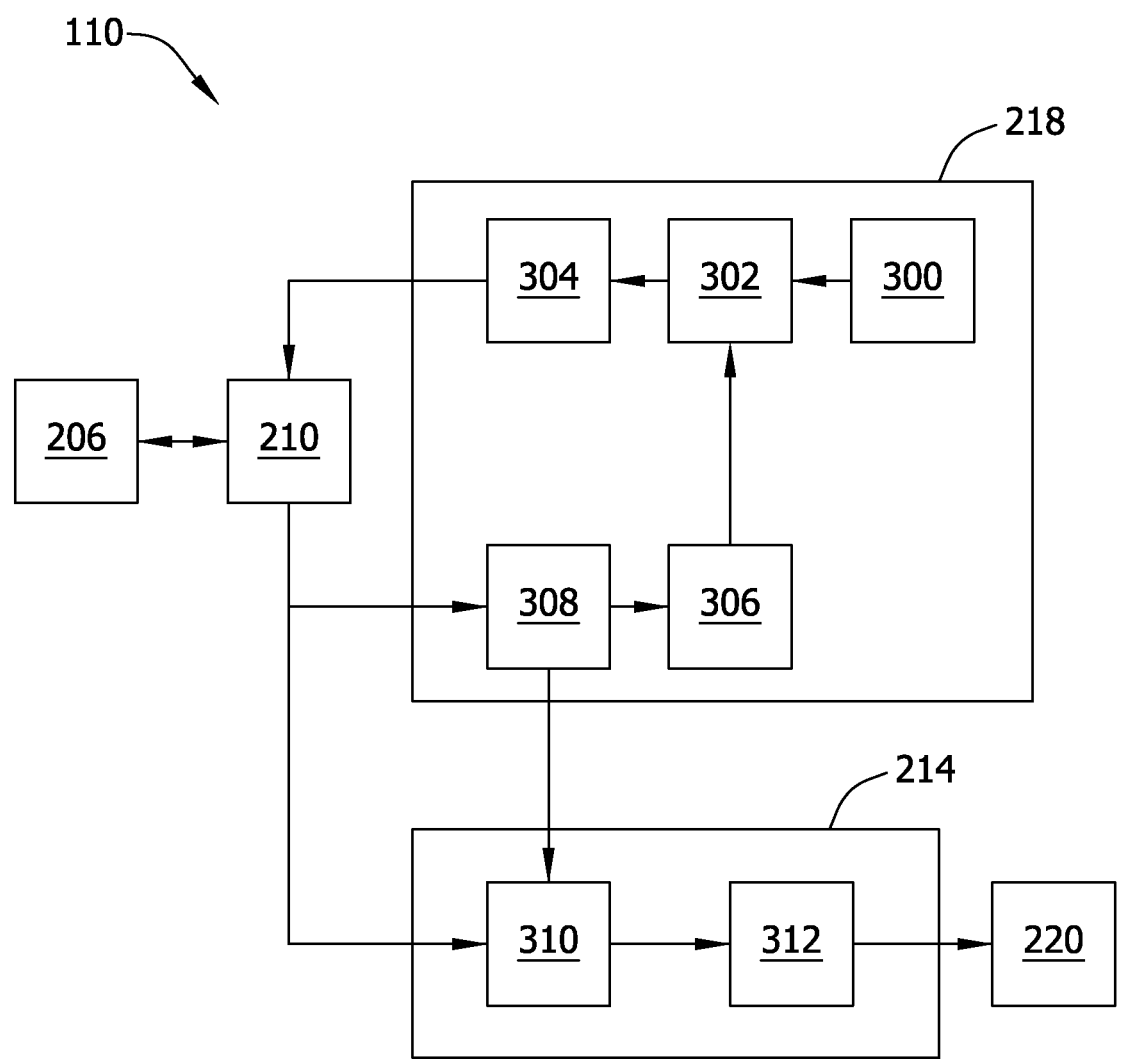
FIG. 3 is a partial block diagram of the exemplary sensor assembly shown in FIG. 2.

FIG. 3 is a partial block diagram of sensor assembly 110 including an exemplary signal generator 218 and an exemplary reception signal detector 214. In the exemplary embodiment, signal generator 218 includes a voltage source 300 that is coupled to a voltage source switch 302. Voltage source switch 302 is coupled to a voltage controlled oscillator 304 and to a frequency-to-voltage (F-V) converter 306. Moreover, in the exemplary embodiment, voltage controlled oscillator 304 is coupled to emitter 206 via directional coupling device 210, and a phase-locked-loop (PLL) 308 is coupled to directional coupling device 210 and to F-V converter 306.

Reception signal detector 214, in the exemplary embodiment, includes a signal demodulator 310 and a power calculator 312 that are coupled together. Moreover, signal demodulator 310 is coupled to emitter 206 via directional coupling device 210 and to PLL 308. In the exemplary embodiment, power calculator 312 is coupled to subtractor 220.

In the exemplary embodiment, during operation, voltage source 300 transmits a first voltage signal having a predefined amplitude to voltage source switch 302. Voltage source switch 302 receives the first voltage signal from voltage source 300 and a second voltage signal from F-V converter 306 and selectively transmits, as described in more detail below, the first voltage signal or the second voltage signal to voltage controlled oscillator 304. More specifically, in the exemplary embodiment, the first voltage signal from voltage source 300 is used to initiate an operation of signal generator 218 and/or sensor assembly 110. As such, voltage source switch 302 transmits the first voltage signal from voltage source 300 to voltage controlled oscillator 304 during a startup of sensor assembly 110. After F-V converter 306 outputs the second voltage signal, voltage source switch 302 transmits the second voltage signal from F-V converter 306 to voltage controlled oscillator 304. Moreover, after F-V converter 306 has output the second voltage signal to voltage source switch 302, voltage source 300 may be disabled and/or de-energized such that only F-V converter 306 provides a voltage signal to voltage source switch 302 and to voltage controlled oscillator 304.

In the exemplary embodiment, voltage controlled oscillator 304 generates a microwave signal that has a frequency based on and/or proportional to the received voltage signal from voltage source switch 302. As such, voltage controlled oscillator 304 transmits a microwave signal at a desired frequency to emitter 206. As described herein, emitter 206 receives the microwave signal and a detuned loading signal is transmitted to directional coupling device 210 in response to an object interfering with electromagnetic field 224 (shown in FIG. 2), as described more fully herein. Directional coupling device 210 transmits the detuned loading signal to PLL 308 and to signal demodulator 310. Moreover, in the exemplary embodiment, the detuned loading signal may include a plurality of frequency components, such as a frequency representative of the loading induced to electromagnetic field 224 (shown in FIG. 2) by an object (hereinafter referred to as the "loading frequency"), one or more noise frequencies, and/or any other frequency that may be received by emitter 206.

PLL 308, in the exemplary embodiment, detects and/or extracts a primary frequency of the detuned loading signal and transmits a signal representative of the primary detuned loading signal frequency (hereinafter referred to as a "primary frequency signal") to F-V converter 306 and to signal demodulator 310. As used herein, the term "primary frequency" refers to a frequency that is higher in amplitude and/or power than any other frequency within a signal. In the exemplary embodiment, the primary frequency is equal or approximately equal to the loading frequency. Moreover, in the exemplary embodiment, PLL 308 "tracks" the primary frequency signal such that a resonant frequency shift of emitter 206 is detected by PLL 308 and is incorporated into the primary frequency signal.

In the exemplary embodiment, F-V converter 306 converts the primary frequency signal to a proportional voltage signal and transmits the voltage signal to voltage source switch 302 for energizing voltage controlled oscillator 304. Moreover, in the exemplary embodiment, after F-V converter 306 transmits the voltage signal to voltage source switch 302, voltage source 300 is de-energized to reduce power consumption, and voltage controlled oscillator 304 is energized only by the voltage signal from F-V converter 306. As such, the primary frequency signal is fed back to energize emitter 206 via voltage controlled oscillator 304 to maintain closed loop control of the emitter frequency.

Signal demodulator 310, in the exemplary embodiment, demodulates the detuned loading signal synchronously with respect to the primary frequency signal received from PLL 308. In other words, signal demodulator 310 uses the primary frequency signal received from PLL 308 to extract and/or to detect a peak amplitude and/or an amplitude envelope of the detuned loading signal at the primary frequency. Alternatively, signal demodulator 310 detects the peak amplitude at a frequency approximately equal to the primary frequency signal by filtering out or otherwise removing signal frequencies, such as noise, that are not equal to the primary frequency and/or that are not equal to a frequency within a predefined frequency band centered about the primary frequency. As such, in the exemplary embodiment, signal demodulator 310 facilitates detecting and/or measuring an amplitude of the detuned loading signal at the primary frequency (hereinafter referred to as a "demodulated loading signal") such that a power level of the primary frequency may be accurately determined.

Moreover, signal demodulator 310 transmits a signal representative of the demodulated loading signal to power calculator 312. In the exemplary embodiment, power calculator 312 measures and/or quantifies an amount of power contained in the demodulated loading signal and transmits a signal representative of the measured and/or quantified amount of power to subtractor 220. Subtractor 220, in the exemplary embodiment, compares the power of the demodulated loading signal to the power of the transmitted microwave signal, and a proximity measurement is generated based on the comparison, as described more fully above. In an alternative embodiment, power calculator 312 may also include, or may be replaced by, a peak detector, a root mean square (RMS) detector, a phase detector, a resonance width detector, and/or any other detector that measures an amplitude of the demodulated loading signal, such as the voltage and/or current amplitude of the demodulated loading signal, and/or a phase of the demodulated loading signal at the primary frequency. In such an embodiment, transmission signal detector 212 (shown in FIG. 2) measures the amplitude and/or the phase of the transmitted microwave signal, and subtractor 220 compares the amplitude and/or the phase of the transmitted microwave signal with the amplitude and/or the phase of the demodulated loading signal for use in measuring the proximity of an object to emitter 206.

As described herein, sensor assembly 110 overcomes the disadvantages of the prior art by removing noise and/or other undesired frequency components from an emitter loading signal that is representative of a proximity of an object to the emitter. In contrast to known microwave sensors, sensor assembly 110 detects an amplitude of a primary frequency of a detuned loading signal received from the emitter and calculates an amount of power contained in the detuned loading signal only at the primary frequency. As such, other undesired frequencies are not included in the power calculation. Moreover, a proximity measurement is calculated based on the power calculation. Accordingly, sensor assembly 110 enables a more accurate proximity measurement to be made as compared to prior art sensors.

A technical effect of the system and apparatus described herein includes at least one of: (a) transmitting at least one microwave signal to an emitter; (b) generating an electromagnetic field from at least one microwave signal; (c) generating a loading signal representative of a disruption of an electromagnetic field; (d) calculating at least one of an amplitude, a phase, and a power of a loading signal at a primary frequency of the loading signal; and (e) calculating a proximity of a machine component to an emitter based on at least one of an amplitude, a phase, and a power of a loading signal at a primary frequency of a loading signal.

The above-described embodiments provide an efficient and cost-effective sensor assembly for use in measuring the proximity of an object, such as a machine component. The sensor assembly energizes an emitter with a microwave signal to generate an electromagnetic field. When the machine component is positioned within the field, a loading is induced to the emitter. A signal representative of the emitter loading is transmitted to a signal processing device. Undesired frequency components are removed from the signal and an amount of power contained in the signal is calculated. Moreover, the sensor assembly calculates a proximity of the component based on the amount of power contained in the loading signal received from the emitter and based on an amount of power contained in the microwave signal transmitted to the emitter. As such, the sensor assembly described herein facilitates providing a stable and robust proximity measurement.

Exemplary embodiments of a sensor assembly and methods for measuring a proximity of a machine component relative to a sensor are described above in detail. The methods and sensor assembly are not limited to the specific embodiments described herein, but rather, components of the sensor assembly and/or steps of the methods may be utilized independently and separately from other components and/or steps described herein. For example, the sensor assembly may also be used in combination with other measuring systems and methods, and is not limited to practice with only the power system as described herein. Rather, the exemplary embodiment can be implemented and utilized in connection with many other measurement and/or monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A microwave sensor assembly comprising:
   a signal generator for generating at least one microwave signal;
   an emitter coupled to the signal generator, the emitter configured to generate an electromagnetic field from the at least one microwave signal, wherein the emitter is detuned when an object is positioned within the electromagnetic field such that a loading signal is generated;
   a detector coupled to the emitter and to the signal generator, the detector configured to calculate at least one of an amplitude, a phase, and a power of the loading signal at a primary frequency of the loading signal for use in measuring a proximity of an object to the emitter; and
   a phase-locked loop configured to receive the loading signal and to generate a loading frequency signal that is approximately equal to the primary frequency of the loading signal.

2. The microwave sensor assembly in accordance with claim 1, further comprising a frequency-to-voltage converter coupled to the phase-locked loop, the frequency-to-voltage converter configured to receive the loading frequency signal and to convert the loading frequency signal to a first voltage signal for use in generating the microwave signal.

3. The microwave sensor assembly in accordance with claim 2, further comprising:
   a voltage source configured to generated a second voltage signal; and
   a voltage source switch coupled to the voltage source and to the frequency-to-voltage converter, the voltage source switch selectively transmits the first voltage signal and the second voltage signal for use in generating the microwave signal.

4. The microwave sensor assembly in accordance with claim 3, wherein the voltage source is de-energized when the frequency-to-voltage converter transmits the first voltage signal to the voltage source switch.

5. The microwave sensor assembly in accordance with claim 1, wherein the signal demodulator receives the loading frequency signal and determines a peak amplitude of the loading signal at the primary frequency.

6. The microwave sensor assembly in accordance with claim 5, comprising a power calculator coupled to the signal demodulator, the power calculator configured to:
   receive a signal representative of the peak amplitude of the loading signal; and
   calculate an amount of power contained in the peak amplitude signal for use in determining the proximity of the object to the emitter.

7. A power system comprising:
   a machine comprising at least one component;
   a microwave sensor assembly positioned proximate to said at least one component and comprising:
      a signal generator for generating at least one microwave signal; and
      an emitter coupled to said signal generator, said emitter configured to generate an electromagnetic field from the at least one microwave signal, wherein said emitter is detuned when an object is positioned within the electromagnetic field such that a loading signal is generated;
      a detector coupled to said emitter and to said signal generator, said detector configured to calculate at least one of an amplitude, a phase, and a power of the loading signal at a primary frequency of the loading signal for use in measuring a proximity of said at least one component to said emitter, and
      a phase-locked loop configured to receive the loading signal and to generate a loading frequency signal that is approximately equal to the primary frequency of the loading signal.

8. The power system in accordance with claim 7, comprising a frequency-to-voltage converter coupled to the phase-locked loop, the frequency-to-voltage converter configured to receive the loading frequency signal and to convert the loading frequency signal to a first voltage signal for use in generating the microwave signal.

9. The power system in accordance with claim 8, comprising:
   a voltage source configured to generated a second voltage signal; and
   a voltage source switch coupled to the voltage source and to the frequency-to-voltage converter, the voltage source switch selectively transmits the first voltage signal and the second voltage signal for use in generating the microwave signal.

10. The power system in accordance with claim 9, wherein the voltage source is de-energized when the frequency-to-voltage converter transmits the first voltage signal to the voltage source switch.

11. The power system in accordance with claim 7, wherein the signal demodulator receives the loading frequency signal and determines a peak amplitude of the loading signal at the primary frequency.

12. The power system in accordance with claim 11, comprising a power calculator coupled to the signal demodulator, the power calculator configured to:
- receive a signal representative of the peak amplitude of the loading signal; and
- calculate an amount of power contained in the peak amplitude signal for use in determining the proximity of the at least one component to the emitter.

13. A method for measuring a proximity of a machine component relative to an emitter, the method comprising:
- transmitting at least one microwave signal to an emitter;
- generating an electromagnetic field from the at least one microwave signal;
- generating a loading signal representative of a disruption of the electromagnetic field, wherein the loading signal includes a plurality of frequencies;
- calculating at least one of an amplitude, a phase, and a power of the loading signal at a primary frequency of the loading signal;
- calculating a proximity of the machine component to the emitter based on at least one of the calculated amplitude, phase, and power of the loading signal and
- extracting the primary frequency of the loading signal from the plurality of frequencies; and
- generating a loading frequency signal that is representative of the primary frequency.

14. The method in accordance with claim 13, comprising converting the loading frequency signal to a first voltage signal for use in generating the microwave signal.

15. The method in accordance with claim 13, comprising determining a peak amplitude of the loading signal at the primary frequency.

16. The method in accordance with claim 15, wherein the determining a peak amplitude of the loading signal at the primary frequency comprises filtering the loading signal to remove frequencies that are not equal to the primary frequency.

17. The method in accordance with claim 15, comprising:
- receiving a signal representative of the peak amplitude of the loading signal; and
- calculating an amount of power contained in the peak amplitude signal for use in calculating the proximity of the machine component to the emitter.

* * * * *